(12) United States Patent
Smith et al.

(10) Patent No.: US 6,608,880 B2
(45) Date of Patent: Aug. 19, 2003

(54) REDUCED PRESSURE DROP DEBRIS FILTER BOTTOM NOZZLE FOR A FUEL ASSEMBLY OF A NUCLEAR REACTOR

(75) Inventors: Michael G. Smith, Columbia, SC (US); Kyouseok Lee, Tae-Jon (KR); Yu Chung Lee, Columbia, SC (US); Yonghwan Kim, Tae-Jon (KR)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 54 days.

(21) Appl. No.: 09/907,405

(22) Filed: Jul. 17, 2001

(65) Prior Publication Data

US 2003/0016776 A1 Jan. 23, 2003

(51) Int. Cl.[7] .................................................. G21C 3/32
(52) U.S. Cl. ........................ 376/352; 376/313; 376/443
(58) Field of Search ................................ 376/313, 352, 376/443

(56) References Cited

U.S. PATENT DOCUMENTS

| 4,420,457 | A | * | 12/1983 | Le Pargneux | ............... | 376/352 |
|---|---|---|---|---|---|---|
| 4,900,507 | A | | 2/1990 | Shallenberger et al. | | |
| 5,154,879 | A | * | 10/1992 | Grattier | ...................... | 376/313 |
| 5,160,697 | A | * | 11/1992 | Verdier et al. | .............. | 376/310 |
| 5,748,694 | A | * | 5/1998 | King | .......................... | 376/313 |
| 5,799,052 | A | * | 8/1998 | Beuerlein | ................... | 376/313 |

* cited by examiner

Primary Examiner—Michael J. Carone
Assistant Examiner—Daniel Matz

(57) ABSTRACT

A reduced pressure drop debris filter bottom nozzle for use in a fuel assembly of a nuclear reactor includes a plate member formed with a plurality of first flow holes and a plurality of second flow holes. The first flow holes are oblong in cross section and may be of an oval configuration. The first flow holes each have in cross section a major axis and a minor axis, the major axis being longer than the minor axis. The second flow holes are circular in cross section and may have a diameter substantially equal to the minor axis of the first flow holes. The bottom nozzle also features support ligaments that extend between the first flow holes and that are axially aligned with fuel rods within the fuel assembly.

20 Claims, 3 Drawing Sheets

REDUCED PRESSURE DROP DEBRIS FILTER BOTTOM NOZZLE FOR A FUEL ASSEMBLY OF A NUCLEAR REACTOR

BACKGROUND OF THE INVENTION

1. Field of the Invention

The present invention relates generally to nuclear reactors and, more particularly, to a reduced pressure drop debris filter bottom nozzle for a fuel assembly of a nuclear reactor.

2. Description of the Related Art

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems. Most of the debris consists of metal turnings which were probably left in the primary system after steam generator repair or replacement.

In particular, fuel assembly damage due to debris trapped at the lowermost grid has been noted in reactors. Debris enters through the fuel assembly bottom nozzle flow holes from the coolant flow openings in the lower core support plate when the plant is started up. The debris tends to become lodged in the support grids of the fuel assembly within the spaces between the "egg-crate" shaped cell walls of the grid and the fuel rod tubes. The damage consists of fuel rod tube perforations caused by fretting of debris in contact with the exterior of the tube. Flowing coolant causes the debris to gyrate which tends to cut through the cladding of the fuel rods Several different approaches have been proposed and tried for carrying out the removal of debris from nuclear reactors. One approach has been to form a large number of nozzle holes in the plate member of the bottom nozzle, the holes being smaller than the maximum dimension across flow passages through the grids downstream of the nozzle. Such debris filter bottom nozzles trap debris large enough to become lodged in the downstream grids. Debris small enough to pass through the debris filter bottom nozzle continues through the passages of the grids without becoming lodged in the grids or causing fuel rod damage.

The debris filtering effect of the bottom nozzle has been enhanced by the lowermost grid. The lowermost or protective grid is similar in design to other fuel assembly structural grids, with interlocking straps forming square cells around each fuel rod and thimble tube. The protective grid is located at the bottom of the fuel assembly closely adjacent the bottom nozzle. The flow holes in the bottom nozzle are aligned with the protective grid straps such that the cross sectional centers of the holes are either axially aligned with an intersection between a pair of interlocking straps or are centered at the midpoint of a strap at the side of a cell. In such manner, the holes that are centered on strap intersections are quartered and those aligned with strap midpoints are bisected. The maximum debris size that can pass through such a bottom nozzle/protective grid combination is accordingly reduced.

While such debris filter bottom nozzles have been effective for their intended purposes, such nozzles have not been without limitation. For instance, it is desirable to reduce the pressure drop of the water flowing through the holes of the bottom nozzle. As such, it is desired to provide an improved debris filter bottom nozzle that has a reduced pressure drop without meaningfully impairing the debris filtering effect of the bottom nozzle.

SUMMARY OF THE INVENTION

In view of the foregoing, a reduced pressure drop debris filter bottom nozzle for use in a fuel assembly of a nuclear reactor includes a plate member formed with a plurality of first flow holes and a plurality of second flow holes. The first flow holes are oblong in cross section and may be of an oval configuration. The first flow holes each have in cross section a major axis and a minor axis, the major axis being longer than the minor axis. The second flow holes are circular in cross section and may have a diameter substantially equal to the minor axis of the first flow holes. The bottom nozzle also features support ligaments that extend between the first flow holes and that are axially aligned with fuel rods within the fuel assembly.

An aspect of the present invention is to provide a bottom nozzle for a fuel assembly of a nuclear reactor having a plurality of first flow holes that are oblong in cross section.

Another aspect of the present invention is to provide a debris filter bottom nozzle for a fuel assembly of a nuclear reactor having a reduced pressure drop across the nozzle.

Another aspect of the present invention is to provide a debris filter bottom nozzle for a fuel assembly of a nuclear reactor in which the nozzle is formed with a plurality of flow holes that, when cooperating with a protective grid of the fuel assembly, resist the passage of debris that would be sufficiently large to become lodged in the passages of the grids of the fuel assembly.

Another aspect of the present invention is to provide a fuel assembly for use in a nuclear reactor having a debris filter bottom nozzle with flow holes configured thereon that reduce the pressure drop across the bottom nozzle yet still resist the passage of debris into the fuel cell that is large enough to otherwise become lodged in the fuel cell.

Another aspect of the present invention is to provide a debris filtering nozzle for use in a fuel assembly of a nuclear reactor of the type having a grid and a plurality of fuel rods, in which the grid includes a plurality of first straps aligned with one another and a plurality of second straps aligned with one another, and in which the general nature of the nozzle can be stated as including a plate member having a substantially planar first surface and a substantially planar second surface opposite one another, the plate member being formed with a plurality of first flow holes and a plurality of second flow holes extending between the first and second surfaces, the plurality of first flow holes being oblong in cross section, the first surface being structured to be disposed adjacent the grid.

Another aspect of the present invention is to provide a fuel assembly of a nuclear reactor, in which the general nature of the fuel assembly can be stated as including a plurality of fuel rods, a grid having a plurality of first straps aligned with one another and a plurality of second straps aligned with one another, the first and second straps together defining a plurality of cells in the grid, the fuel rods being carried in the cells, a debris filtering nozzle including a plate member having a substantially planar first surface and a substantially planar second surface opposite one another, the first surface being disposed adjacent the grid, the plate member being formed with a plurality of first flow holes and a plurality of second flow holes extending between the first and second surfaces, the plurality of first flow holes being oblong in cross section, and at least one of the first and second straps extending across at least one of the first flow holes.

BRIEF DESCRIPTION OF THE DRAWINGS

A further understanding of the invention can be gained from the following description of the preferred embodiment when read in conjunction with the accompanying figures in which.

Similar numerals refer to similar parts throughout the specification.

DESCRIPTION OF THE PREFERRED EMBODIMENT

Figure 1:
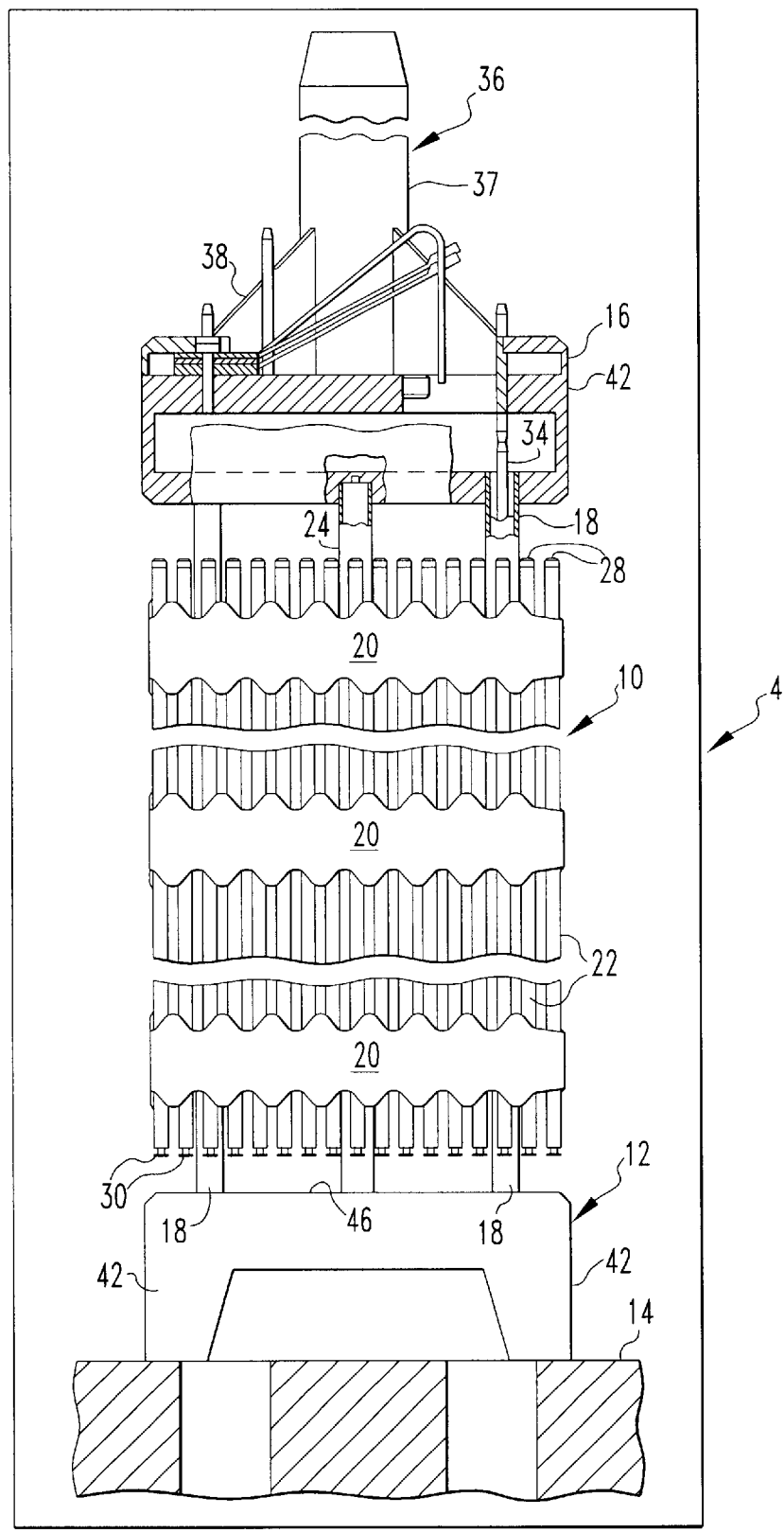
FIG. 1 is a schematic foreshortened front elevational view of a nuclear reactor including a fuel cell in accordance with the present invention.

A fuel assembly 10 mounted in a schematically depicted nuclear reactor 4 is depicted generally in FIG. 1. The fuel assembly 10 includes a reduced pressure drop debris filter bottom nozzle 12 that is depicted in FIGS. 1–5. As will be set forth more fully below, the bottom nozzle 12 is advantageously configured to resist the entry of debris larger than a given size into the fuel assembly 10 yet results in a pressure drop less than that of previously known bottom nozzles.

The bottom nozzle 12 supports the fuel assembly 10 on a lower core support plate 14 in the core region of the nuclear reactor 4. The nuclear reactor 4 is a pressurized water reactor that includes a plurality of the fuel assemblies 10 disposed on the core support plate 14. In addition to the bottom nozzle 12, the structural skeleton of the fuel assembly 10 also includes a top nozzle 16 at its upper end and a number of elongated guide tubes or thimble tubes 18 which extend longitudinally between the bottom and top nozzles 12 and 16 and at opposite ends are connected therewith.

The fuel assembly 10 further includes a plurality of transverse grids 20 axially spaced along and mounted to the thimble tubes 18 and an organized array of elongated fuel rods 22 transversely spaced and supported by the grids 20. Also, the fuel assembly 10 has an instrumentation tube 24 located in the center thereof that extends between the bottom and top nozzles 12 and 16. With such an arrangement of parts, the fuel assembly 10 forms an integral unit capable of being conveniently handled without damaging the assembly parts.

As mentioned above, the fuel rods 22 in the array thereof in the fuel assembly 10 are held in spaced relationship with one another by the grids 20 spaced along the length of the fuel assembly 10. Each fuel rod 22 includes a plurality of nuclear fuel pellets and is closed at its opposite ends by upper and lower end plugs 28 and 30. The fuel pellets are composed of fissile material and are responsible for creating the reactive power of the nuclear reactor 4.

A liquid moderator/coolant such as water, or water containing boron, is pumped upwardly through a plurality of flow openings in the lower core plate 14 to the fuel assembly 10. The bottom nozzle 12 of the fuel assembly 10 passes the coolant flow upwardly through the thimble tubes 18 and along the fuel rods 22 of the assembly in order to extract heat generated therein for the production of useful work.

To control the fission process, a number of control rods 34 are reciprocally movable in the thimble tubes 18 located at predetermined positions in the fuel assembly 10. Specifically, a rod cluster control mechanism 36 positioned above the top nozzle 16 supports the control rods 34. The control mechanism 36 has an internally threaded cylindrical member 37 with a plurality of radially extending arms 38. Each arm 38 is interconnected to a control rod 34 such that the control mechanism 36 is operable to move the control rods 34 vertically in the thimble tubes 18 to thereby control the fission process in the fuel assembly 10, all in a well-known manner. It is understood, however, that the bottom nozzle 12 can be employed in reactors having different configurations than that specifically described above without departing from the concept of the present invention.

As indicated above, damage to the fuel assembly 10 due to debris trapped at or below the grids 20 is preferably avoided by configuring holes in the bottom nozzle 12 to trap such debris and resist the entry thereof into the fuel assembly 10. As will be set forth more fully below, the bottom nozzle 12 advantageously includes holes that are configured not only to resist the entry of such debris but also to reduce the pressure drop there-across compared with previously known bottom nozzles.

As can be seen in FIG. 1, the bottom nozzle 12 includes a plate member 46 that is supported on a plurality of legs 42 that rest against the core support plate 14. The legs 42 may be fastened to the plate member 46 by welding, bolting, or other attachment methodology, or the legs 42 and the plate member 46 may be integrally formed as a monolithic structure such as by casting or forging.

Figure 2:
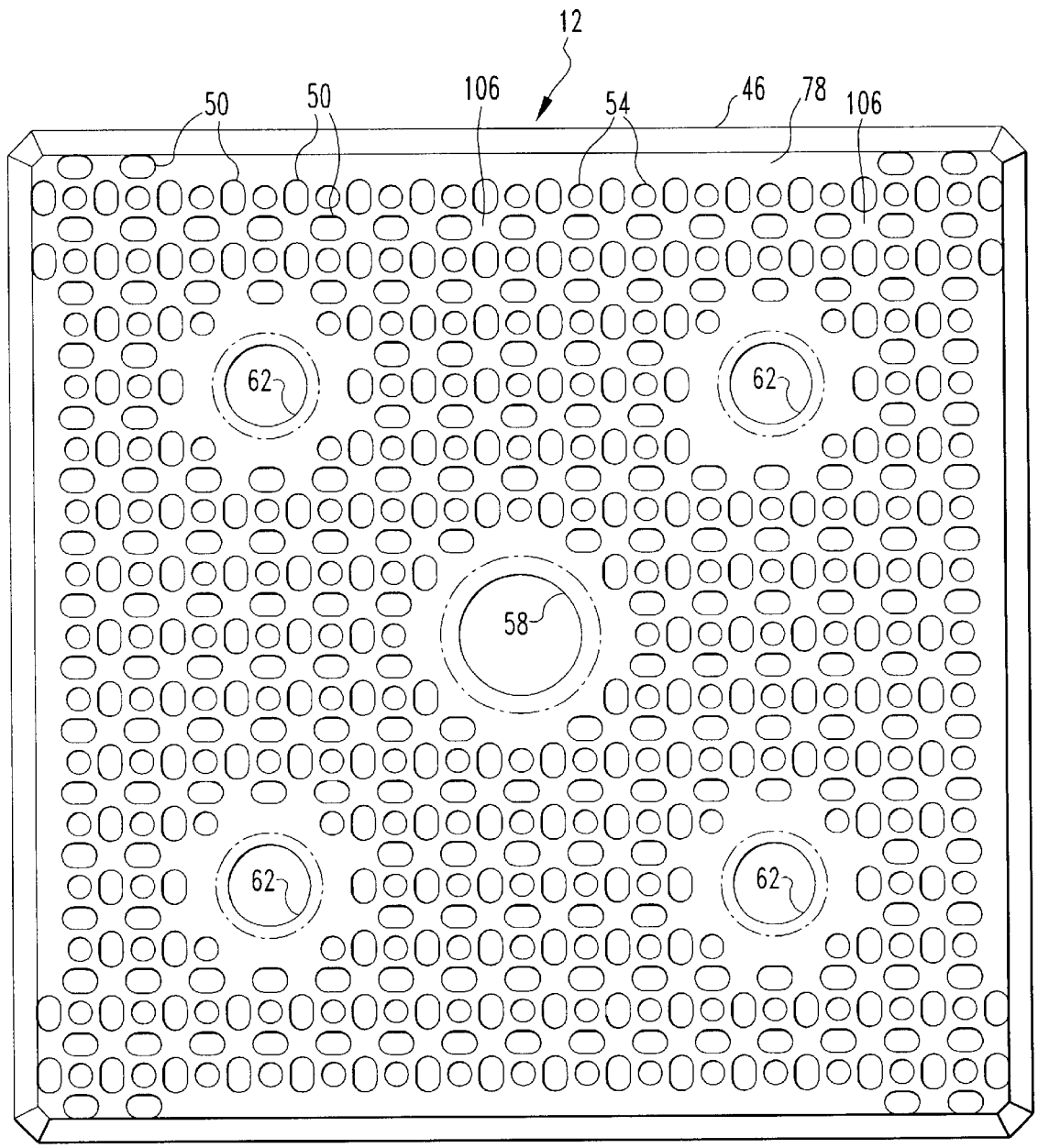
FIG. 2 is a top plan view of a reduced pressure drop debris filter bottom nozzle in accordance with the present invention.
Figure 3:
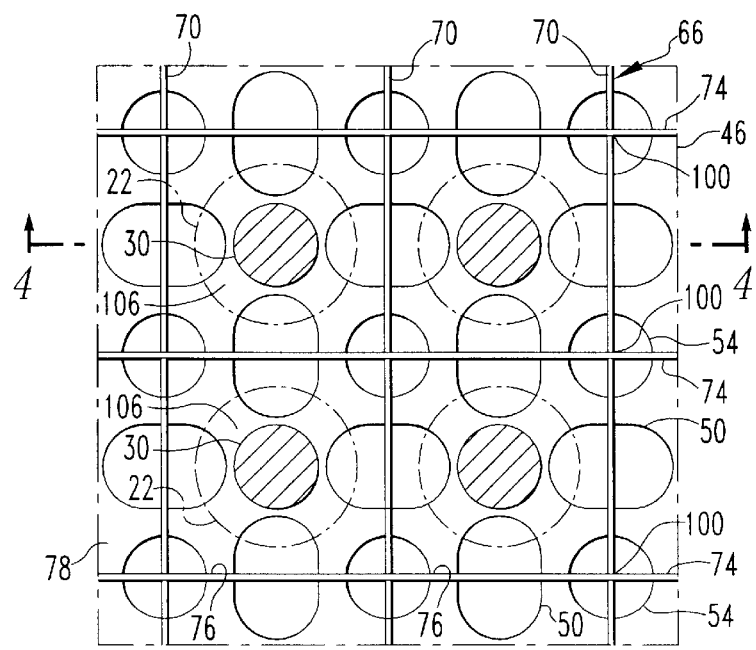
FIG. 3 is an enlarged view of a portion of FIG. 2, additionally including a portion of a protective grid and a plurality of fuel rods disposed thereon.

As is best shown in FIGS. 2 and 3, the plate member 46 includes a plurality of first flow holes 50 formed therein that are non-circular in cross section and a plurality of second flow holes 54 formed therein that are substantially circular in cross section. The plate member 46 additionally includes an instrument guide hole 58 formed generally centrally therein as well as a plurality of thimble attachment holes 62 formed therein at distributed locations on the plate member 46.

Figure 5:
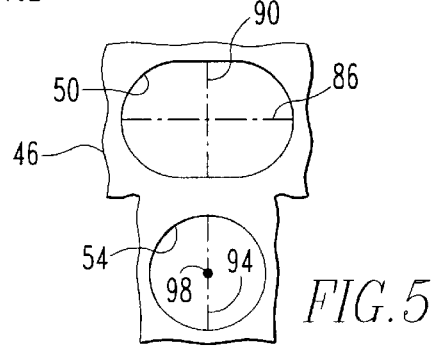
FIG. 5 is an enlarged top plan view of a portion of the nozzle into which a first flow hole and a second flow hole are formed.

As can be seen in FIGS. 3 and 5, the first flow holes 50 are of a generally oblong shape, and more particularly are of a generally oval shape, meaning that in cross section they have semi-circular ends that are connected with straight sides. Such an oval shape also can be referred to as a "translated circle", which refers to the space that has been occupied by a circle during translation of the circle between a first point and a second point shifted from the first point. It will be understood, however, that the first flow holes 50 can be of other oblong cross sections, such as elliptical cross sections or other arcuate or polygonal cross sectional shapes without departing from the concept of the present invention.

The instrument guide hole 58 is provided for mounting the instrument tube 24 onto the bottom nozzle 12 in a known fashion. Similarly, the thimble attachment holes 62 are provided for mounting the thimble tubes 18 to the bottom nozzle 12 in a known fashion. The instrument guide hole 58 and the thimble attachment holes 62 will be discussed no further.

FIG. 3 depicts an enlarged portion of the plate member 46 with a portion of one of the grids 20 and a number of the fuel rods 22 with lower plugs 30 disposed over the plate member 46. The arrangement of FIG. 3 is depicted generally in elevation in FIG. 4. The lowermost grid 20 of the fuel assembly 10 is typically referred to as a protective grid 66, and in accordance with the present invention the protective grid 66 works cooperatively with the first and second flow holes 50 and 54 to resist the entry into the fuel assembly 10 of debris larger than a given size. It is noted that the protective grid 66 is not depicted in FIG. 1 for purposes of clarity.

As is best shown in FIG. 3, the protective grid 66 includes a plurality of first straps 70 and a plurality of second straps 74. The first straps 70 are elongated narrow sheets of material that are oriented substantially parallel with or aligned with one another. Similarly, the second straps 74 are of a similar configuration and are oriented substantially parallel with or aligned with one another. The first and second straps 70 and 74 are interconnected with one another in a grid or lattice pattern to define a plurality of cells 76 between the first and second straps 70 and 74. The fuel rods 22 are disposed in the cells 76 and are held therein by springs 80 and dimples 84 formed on the first and second straps 70 and 74 in a known fashion.

Figure 4:
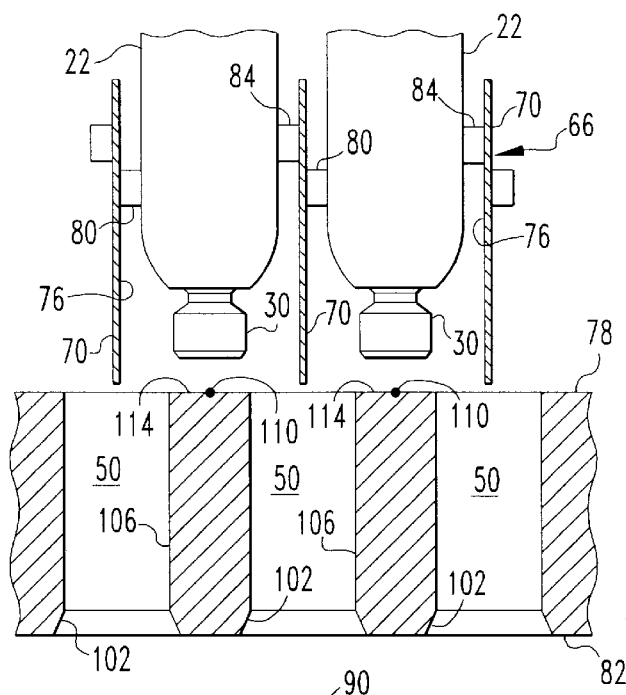
FIG. 4 is a sectional view as taken along line 4—4 of FIG. 3.

The plate member 46 includes a generally planar first surface 78 and a generally planar second surface 82 opposite one another. As is best shown in FIG. 4, the first surface 78 is disposed adjacent the protective grid 66. As is known in the relevant art, the liquid moderator/coolant flows in a vertical direction with respect to FIG. 4, meaning that it flows through the first and second flow holes 50 and 54 in a direction from the second surface 82 toward and past the first surface 78.

As is best shown in FIGS. 3 and 5, each of the first flow holes 50 in cross section includes a major axis 86 and a minor axis 90, the major axis 86 being longer than the minor axis 90. In the present embodiment of the bottom nozzle 12, the major axis 86 and minor axis 90 of each first flow hole 50 are substantially perpendicular with one another, although it is understood that the first flow holes 50 can be of other configurations whereby such a perpendicular relationship does not exist.

While all of the first flow holes 50 are depicted in the accompanying figures as being of the same size and shape, and all of the second flow holes 54 are similarly depicted as being of the same size and shape, it is understood that the first flow holes 50 can be of various sizes and shapes on a single plate member 46, and the second flow holes 54 can be similarly varied, depending upon the specific needs of the particular application.

It can be seen from FIG. 5 that each of the second flow holes 54 is of a diameter 94 in cross section. The minor axis 90 of the first flow holes 50 is substantially equal to the diameter 94 of the second flow holes 54, which is typically in the range of about 0.175–0.225 inches. The major axis 86 is of a size in about the range of 0.250–0.300 inches. It is understood, however, that different size relationships between the major and minor axes 86 and 90 and between the first and second flow holes 50 and 54 are possible depending upon the specific needs of the particular application.

As can be seen in FIG. 3, the first flow holes 50 are arranged on the plate member 46 such that the minor axes 90 are all in register either with one of the first straps 70 or with one of the second straps 74. In this circumstance, to be "in register with" refers to the minor axis 90 being aligned with or overlaid by a first strap 70 or a second strap 74. It is understood, however, that the first flow holes 50 may be arranged on the plate member 46 such that some or all of the major axes 86 are in register with the first straps 70 and/or the second straps 74 instead of or in addition to the minor axes 90. Also, the first flow holes 50 can have other spatial relationships with the first and second straps 70 and 74.

From FIG. 3, it thus can be seen that the first and second straps 70 and 74 bisect each first flow hole 50 along the minor axis 90 thereof. As indicated above, the first and second straps 70 and 74 of the protective grid 66 cooperate with the first and second flow holes 50 and 54 to resist entry into the fuel assembly 10 of debris of a given size. It thus can be seen that the maximum cross-sectional size of a debris particle that can pass through the first flow holes 50 and into the fuel assembly 10 is that which can pass through a bisected portion of one of the first flow holes 50 which are bisected along the minor axes 90 thereof by the first and second straps 70 and 74.

As can be seen in FIG. 5, the second flow holes 54 each include a cross-sectional center 98. In the embodiment of the bottom nozzle 12 depicted in FIG. 3, the cross sectional centers 98 are each axially aligned with an intersection 100 between one of the first straps 70 and one of the second straps 74. It thus can be seen from FIG. 3 that in the depicted embodiment of the bottom nozzle 12, the second flow holes 54 are each quartered by a first strap 70 and a second strap 74. Stated otherwise, the cross-sectional centers 98 of the second flow holes 54 are in register with the intersections 100. As can be understood from the foregoing, however, the second flow holes 54 can be arranged on the plate member 46 in different fashions whereby the second flow holes 54 are merely bisected, are otherwise overlaid, or are not overlaid by the first and second straps 70 and 74 depending upon the specific needs of the particular application. In the embodiment depicted in FIG. 3, the maximum particle size in cross section that can be received through the second flow holes 54 in cooperation with the protective grid 66 would be that which can flow through one quadrant of the second flow holes 54 in cross section. While it is understood that larger debris potentially may flow through the bisected first flow holes 50, the first flow holes 50 preferably are configured in such a fashion that any such larger debris still is not large enough to become lodged within the fuel assembly 10.

It can also be understood from the foregoing that the first and second flow holes 50 and 54 can be otherwise arranged on the plate member 46 such that other relationships exist between the first and second flow holes 50 and 54 and the first and second straps 70 and 74. For instance, the first flow holes 50 may each have a cross sectional center that is in register with one of the intersections. Likewise, the second flow holes 54 may be bisected by the first and second straps 70 and 74. As such, it can be seen that numerous other configurations are possible for the plate member 46.

As is best shown in FIG. 4, the first flow holes 50 are each formed with a chamfer 102 adjacent the second surface 82 which further reduces the pressure drop on the liquid moderator/coolant flowing through the first flow holes 50. Though not specifically depicted, each of the second flow holes 54 is similarly formed with a chamfer adjacent the second surface 82. Depending upon the specific needs of the particular application, one or more of the first and second flow holes 50 and 54 may be configured without a chamfer without departing from the concept of the present invention.

As can be seen in the accompanying figures, the plate member 46 includes a plurality of support ligaments 106 between the first flow holes 50. More specifically each support ligament 106 is the material of the plate member 46 that remains after the first flow holes 50 (and/or the second flow holes 54 in other embodiments) are formed in the plate member 46. In the embodiment depicted in FIG. 3, the support ligaments 106 each extend between a confluence of four of the first flow holes 50.

It can further be seen that each support ligament 106 includes a central point 110 defined on the first surface 78 of the plate member 46. In the embodiment of the plate member 46 depicted in FIG. 3, the major axes 86 of the first flow holes 50 surrounding each support ligament 106 are aligned with the central point 110 and extend radially outwardly from the central point 110. Again, depending upon the arrangement of the first and second flow holes 50 and 54, the support ligaments 106 may have a different arrangement with respect to the major and minor axes 86 and 90 of the first flow holes 50.

As can be understood from FIGS. 3 and 4, the support ligaments 106 each provide a support surface 114 defined on the first surface 78 against which one of the lower end plugs 30 of the fuel rods 22 can rest if the fuel rod 22 becomes loosened from the springs 80 and dimples 84 within a cell 76, as may occasionally occur after extended use of the nuclear reactor 4. In this regard, the central points 110 of the support ligaments 106 are in register with the fuel rods 22 and with the lower end plugs 30, meaning that they are axially aligned or that one overlies the other.

In this regard, it can be seen that the major axes 90 of all of the first flow holes 50 are not aligned with one another. Rather, a first portion of the major axes 86 are aligned with one another, and a second portion of the major axes 86 are aligned with one another. More specifically, it can be seen that the first portion of major axes 86 are substantially perpendicular to the second portion of the major axes 86, although it is understood that other relationships of the first flow holes 50 are possible without departing from the concept of the present invention. In other embodiments of the bottom nozzle 20, the major axes 86 may have other relationships with one another.

The cooperation of the first and second flow holes 50 and 54 with the first and second straps 70 and 74 also has the advantageous effect of balancing the flow distribution of the liquid moderator/coolant through the fuel assembly 10. More specifically, the symmetric arrangement of the elongated and round first and second flow holes 50 and 54 has the advantageous effect of evenly distributing the flow of the liquid moderator/coolant past the fuel rods 22. Such an even flow pattern beneficially alleviates the potential for excitement and vibration of the fuel rods 22 that may otherwise result in detrimental contact wear between the fuel rods 22 and the grids 20 in the presence of an undesirable uneven flow pattern.

As is understood in the relevant art, the hydraulic diameter of a flow channel is defined as the cross sectional area of the flow channel divided by the cross sectional perimeter of the flow channel. If the flow channel is circular in cross section, the hydraulic diameter of the circular flow channel is, by definition, equal to the nominal diameter of the flow channel. As such, it can be seen that the hydraulic diameter of the first flow holes 50 is greater than that of the second flow holes 54. Accordingly, the pressure drop experienced by the liquid moderator/coolant in flowing through the first flow holes 50 is less than when flowing through the second flow holes 54. As such, the pressure drop of the plate member 46 depicted in FIG. 3 is generally going to be less than the pressure drop of a plate member having circular holes of the diameter 94. As such, the plate member 46 not only is a debris filter structure, but also has a lower pressure drop than other known bottom nozzles having only circular holes formed therein.

While a particular embodiment of the present invention has been described herein, it is understood that various changes, additions, modifications, and adaptations may be made without departing from the scope of the present invention, as set forth in the following claims.

What is claimed is:

1. A combination of a debris filtering nozzle and a grid for use in a fuel assembly of a nuclear reactor of the type having a plurality of fuel rods, the combination comprising:
   a grid including a plurality of first straps aligned with one another and a plurality of second straps aligned with one another;
   a plate member having a substantially planar first surface and a substantially planar second surface opposite one another, the plate member being formed with a plurality of first flow holes and a plurality of second flow holes extending between the first and second surfaces, the plurality of first flow holes being oblong in cross section, the first surface being disposed adjacent the grid; and
   the first flow holes being ranged on the plate member such that at least a portion of at least one of to first flow holes is overlaid by at least one of the first and second straps.

2. The combination as set forth in claim 1, in which the first flow holes each include in cross section a major axis and a minor axis, the major axis being longer than the minor axis.

3. The combination as set forth in claim 2, in which the first flow holes are arranged on the plate member with the major axes of a first portion of the first flow holes being non-aligned with the major axes of a second portion of the first flow holes.

4. The combination as set forth in claim 3, in which the major axes of the first portion of the first flow holes are oriented substantially perpendicular to the major axes of the second portion of the first flow holes.

5. The combination as set forth in claim 2, in which the first flow holes are arranged on the plate member with one of the major axes and the minor axes of at least a portion of the first flow holes being in register with one of the first and second straps.

6. The combination as set forth in claim 2, in which the first flow holes are arranged on to plate member with the minor axes of a first portion of the first flow holes being in register with the first straps and with the minor axes of a second portion of the first flow holes being in register with the second straps.

7. The combination as set forth in claim 2, in which the plate member includes a plurality of support ligaments, at least a portion of the support ligaments each being disposed adjacent at least a pair of the first flow holes.

8. The combination as set forth in claim 7, in which at least a portion of the support ligaments are each interposed between four of the first flow holes.

9. The combination as set forth in claim 1, in which each first flow hole has a pair of arcuate ends.

10. The combination as set forth in claim 9, in which the first flow holes in cross section are in the shape of an oval.

11. The combination as set forth in claim 1, in which at least a portion of at least one of the plurality of first flow holes and the plurality of second flow holes is formed with a chamfer adjacent the second surface.

12. The combination as set forth in claim 1, in which the second flow holes are arranged on the plate member with the cross sectional center of at least one of the second flow holes being substantially axially aligned with an intersection between one of the first straps and one of the second straps.

13. A fuel assembly of a nuclear reactor, the fuel assembly comprising:

a plurality of fuel rods;

a grid having a plurality of first straps aligned with one another and a plurality of second straps aligned with one another, the first and second straps together defining a plurality of cells in the grid, the fuel rods being carried in the cells;

a debris filtering nozzle including a plate member having a substantially planar first surface and a substantially planar second surface opposite one another, the first surface being disposed adjacent the grid, the plate member being formed with a plurality of first flow holes and a plurality of second flow holes extending between the first and second surfaces, the plurality of first flow holes being oblong in cross section; and at least one of the first and second straps extending across at least one of the first flow holes.

14. The fuel assembly as set forth in claim 13, in which the first flow holes in cross section each include a major axis and a minor axis, the major axis being longer than the minor axis.

15. The fuel assembly as set forth in claim 14, in which one of the major axes and the minor axes of at least a portion of the first flow holes are in register with one of the first and second straps.

16. The fuel assembly as set forth in claim 14, in which the minor axes of a first portion of the first flow holes are in register with the first straps, and in which the minor axes of a second portion of the first flow holes are in register with the second straps.

17. The fuel assembly as set forth in claim 14, in which the plate member includes a plurality of support ligaments, at least a portion of the support ligaments each being disposed adjacent at least a pair of the first flow holes.

18. The fuel assembly as set forth in claim 17, in which each support ligament includes a central point defined on the first surface, and in which the major axes of the first flow holes adjacent each support ligament are radially aligned with the central point of the support ligament.

19. The fuel assembly as set forth in claim 13, in which the cross sectional center of at least one of the second flow holes is substantially axially aligned with an intersection between one of the first straps and one of the second straps.

20. A debris filtering nozzle for use in a fuel assembly of a nuclear reactor of the type having a grid and a plurality of fuel rods, the grid including a plurality of first straps aligned with one another and a plurality of second straps aligned with one another the nozzle comprising:

a plate member having a substantially planar first surface and a substantially planar second surface opposite one another, the plate member being formed with a plurality of first flow holes and a plurality of second flow holes extending between the first and second surfaces, the plurality of first flow holes being oblong in cross section, the first surface being structured to be disposed adjacent the grid;

the first flow holes each including in cross section a major axis and a minor axis, the major axis being longer than the minor axis;

the plate member including a plurality of support ligaments, at least a portion of the support ligaments each being interposed between four of the first flow holes, each such support ligament being structured to be substantially axially aligned with one of the fuel rods; and in which each support ligament includes a central point defined on the first surface, and in which the major axes of the first flow holes between which the at least portion of the support ligaments are interposed are radially aligned with the central points of the support ligaments.

* * * * *